US012482236B2

(12) United States Patent
Cho et al.

(10) Patent No.: US 12,482,236 B2
(45) Date of Patent: Nov. 25, 2025

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Hanjoo Cho, Suwon-si (KR); Jeongin Yun, Suwon-si (KR); Hayoung Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 18/131,252

(22) Filed: Apr. 5, 2023

(65) Prior Publication Data

US 2023/0237776 A1 Jul. 27, 2023

Related U.S. Application Data

(63) Continuation of application No. PCT/KR2022/020610, filed on Dec. 16, 2022.

(30) Foreign Application Priority Data

Dec. 16, 2021 (KR) .......................... 10-2021-0181049

(51) Int. Cl.
*G06V 10/774* (2022.01)
*G06V 10/82* (2022.01)

(52) U.S. Cl.
CPC ............ *G06V 10/774* (2022.01); *G06V 10/82* (2022.01)

(58) Field of Classification Search
CPC .... G06V 10/774; G06V 10/82; G06V 10/454; G06V 10/764; G06V 10/806; G06N 3/04; G06N 3/08; G06N 3/063; G06N 3/045
See application file for complete search history.

(56) References Cited

U.S. PATENT DOCUMENTS 10,674,152 B2 6/2020 Coelho et al.
11,310,501 B2 4/2022 Coelho et al.
(Continued)

FOREIGN PATENT DOCUMENTS

CN 110969251 A 4/2020
CN 111008694 A 4/2020
(Continued)

OTHER PUBLICATIONS

Nicola Tonellotto et al., "Neural network quantization in federated learning at the edge", Information Sciences, vol. 575, Jun. 17, 2021, (20 pages).
(Continued)

*Primary Examiner* — Iriana Cruz
(74) *Attorney, Agent, or Firm* — Sughrue Mion, PLLC

(57) ABSTRACT

An electronic apparatus includes: a communication interface; a memory storing at least one instruction; and a processor configured to execute the at least one instruction to: quantize a first neural network model for identifying an object, to acquire a second neural network model, control the communication interface to transmit information on the second neural network model to an external apparatus, receive, from the external apparatus, feature information for an image stored in the external apparatus acquired based on the second neural network model, and identification information corresponding to the feature information, and train the second neural network model based on the received feature information and the received identification information.

9 Claims, 11 Drawing Sheets

(56) References Cited

U.S. PATENT DOCUMENTS

| | | |
|---|---|---|
| 11,531,864 B2 | 12/2022 | Han et al. |
| 11,625,577 B2 | 4/2023 | Lee et al. |
| 11,823,028 B2 | 11/2023 | Kim et al. |
| 2019/0147322 A1 | 5/2019 | Kim et al. |
| 2020/0019842 A1* | 1/2020 | Kim .................. G06N 3/045 |
| 2020/0092556 A1 | 3/2020 | Coelho et al. |
| 2020/0143250 A1* | 5/2020 | Lee .................. G06N 3/082 |
| 2020/0218962 A1 | 7/2020 | Lee et al. |
| 2020/0275101 A1 | 8/2020 | Coelho et al. |
| 2020/0302271 A1 | 9/2020 | Ovtcharov et al. |
| 2021/0081798 A1 | 3/2021 | Cho et al. |
| 2021/0295173 A1 | 9/2021 | Choi et al. |
| 2022/0067527 A1* | 3/2022 | Xu .................. G06N 3/048 |
| 2023/0206031 A1 | 6/2023 | Lee et al. |

FOREIGN PATENT DOCUMENTS

| | | |
|---|---|---|
| JP | 2020-113273 A | 7/2020 |
| JP | 2021-520082 A | 8/2021 |
| KR | 10-2019-0054454 A | 5/2019 |
| KR | 10-2019-0116035 A | 10/2019 |
| KR | 10-2020-0052182 A | 5/2020 |
| KR | 10-2021-0032140 A | 3/2021 |
| KR | 10-2021-0100855 A | 8/2021 |
| KR | 10-2021-0108413 A | 9/2021 |
| WO | 2020/131968 A1 | 6/2020 |

OTHER PUBLICATIONS

International Search Report (PCT/ISA/210) issued by the International Searching Authority on Mar. 16, 2023 in International Application No. PCT/KR2022/020610.

Written Opinion (PCT/ISA/237) issued by the International Searching Authority on Mar. 16, 2023 in International Application No. PCT/KR2022/020610.

Yaohui Cai et al., "ZeroQ: A Novel Zero Shot Quantization Framework", [Submitted on Jan. 1, 2020], (12 pages).

Yuang Liu et al., "Zero-shot Adversarial Quantization", [Submitted on Mar. 29, 2021 (v1), last revised Mar. 30, 2021 (this version, v2)], (10 pages).

Shoukai Xu et al., "Generative Low Bitwidth Data Free Quantization", [Submitted on Mar. 7, 2020 (v1), last revised Aug. 10, 2020 (this version, v3)], (18 pages).

Yoojin Choi et al., "Data-Free Network Quantization with Adversarial Knowledge Distillation", [Submitted on May 8, 2020], (11 pages).

Qizhe Xie et al., "Self-training with Noisy Student improves ImageNet classification", [Submitted on Nov. 11, 2019 (v1), last revised Jun. 19, 2020 (this version, v4)], (18 pages).

* cited by examiner

100

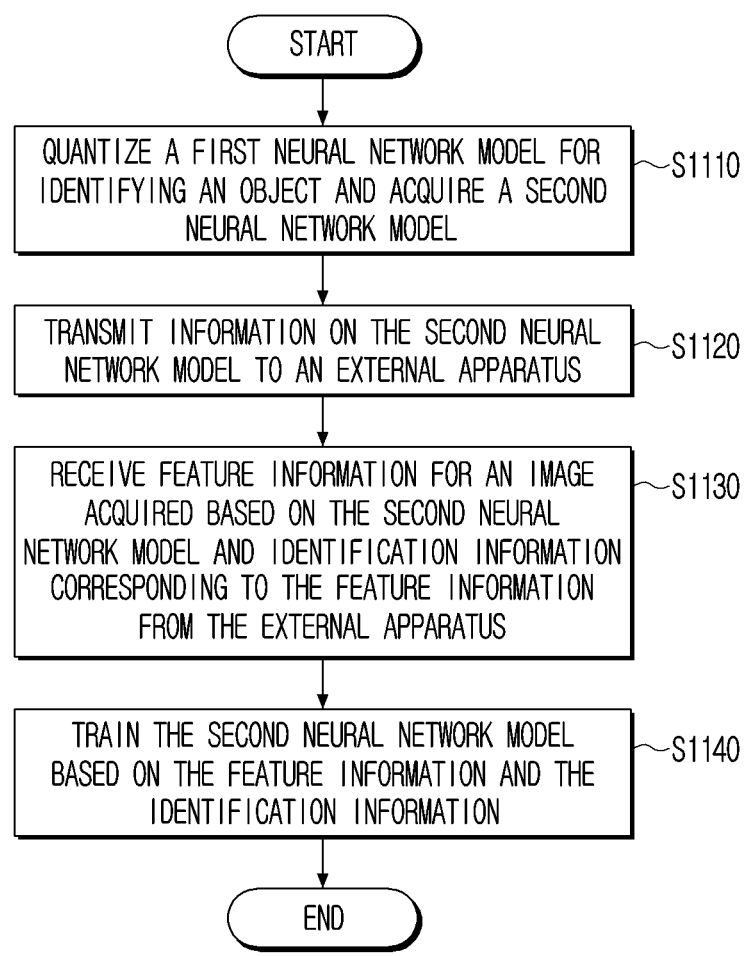

ELECTRONIC APPARATUS AND METHOD FOR CONTROLLING THEREOF

CROSS-REFERENCE TO RELATED APPLICATIONS

This application is a bypass continuation application of International Patent Application No. PCT/KR2022/020610, filed on Dec. 16, 2022, which is based on and claims priority to Korean Patent Application No. 10-2021-0181049, filed on Dec. 16, 2021 in the Korean Intellectual Property Office, the disclosures of each of which are incorporated by reference herein in their entireties.

BACKGROUND OF THE INVENTION

1. Field of the Invention

The disclosure relates to an electronic apparatus and a method for controlling thereof, and more particularly, to an electronic apparatus that quantizes a neural network model, and a method for controlling thereof.

2. Description of the Prior Art

Recently, artificial intelligence systems are being used in a variety of fields. An artificial intelligence system refers to a system in which a machine learns, determines, and becomes smarter by itself, unlike conventional rule-based smart systems. An artificial intelligence system shows an improved recognition rate over time, and becomes more capable of understanding user preference with greater use. For this reason, conventional rule-based smart systems are gradually being replaced by deep learning-based artificial intelligence systems.

An artificial intelligence technology consists of machine learning (for example, deep learning) and element technologies utilizing machine learning. Machine learning refers to an algorithm technology of classifying/learning the characteristics of input data by itself. An element technology refers to a technology for performing functions of a human brain such as cognition and determination by using a machine learning algorithm such as deep learning, and can include fields of technologies such as linguistic understanding, visual understanding, inference/prediction, knowledge representation, and operation control.

Recently, there has been active research toward the development of a technology of quantizing a neural network model. Quantization refers to a technology of converting a weight in a form of a floating point into a form of an integer. This process has a problem in that, when the bit number of an integer is reduced, the operation speed and the usage amount of the memory become greatly reduced (that is, improved), but the accuracy is also greatly reduced.

As another example of quantization methods, a process known as quantization aware training (QAT) trains a neural network model in consideration of a quantization error. However, for performing a QAT, learning data (e.g., images) that was already used for training of a neural network model is needed, but due to a privacy issue, there is a difficulty in collecting the learning data. Accordingly, there is a problem that an actual use environment of a user is difficult to be reflected in a neural network model.

Accordingly, there is a need for a technology for quantizing a neural network model which can protect user privacy, and at the same time, enable user personalization.

SUMMARY OF THE INVENTION

According to an aspect of the disclosure, an electronic apparatus includes: a communication interface; a memory storing at least one instruction; and a processor configured to execute the at least one instruction to: quantize a first neural network model for identifying an object, to acquire a second neural network model, control the communication interface to transmit information on the second neural network model to an external apparatus, receive, from the external apparatus, feature information for an image stored in the external apparatus acquired based on the second neural network model, and identification information corresponding to the feature information, and train the second neural network model based on the received feature information and the received identification information.

The processor may be further configured to execute the at least one instruction to: perform quantization for a first parameter corresponding to a first layer included in the first neural network model, and train the first neural network model based on learning data stored in the memory, in a state wherein the first parameter is fixed, to update a second parameter corresponding to a second layer included in the first neural network model, the second layer being a subsequent layer of the first layer.

The processor may be further configured to execute the at least one instruction to perform quantization for the updated second parameter to acquire a parameter of a layer of the second neural network model corresponding to the second layer of the first neural network model.

The processor may be further configured to execute the at least one instruction to train the first neural network model to update the second parameter based on a plurality of images included in the learning data, the received feature information, and the received identification information.

The processor may be further configured to execute the at least one instruction to: input the received feature information into the first neural network model to acquire first identification information, input the received feature information into the second neural network model to acquire second identification information, and based on a difference between the first identification information and the second identification information being greater than a threshold value, acquire the feature information as learning data, the second neural network model being trained on the learning data.

The processor may be further configured to execute the at least one instruction to, based on the first identification information and the second identification information being different, acquire the first identification information as identification information corresponding to the received feature information.

The processor may be further configured to execute the at least one instruction to: receive a plurality of identification information, and a plurality of feature information respectively corresponding to the plurality of identification information, and based on quantities of each of the plurality of feature information differing from each other, adjust the quantities of at least one of the feature information such that the quantities of each of the plurality of feature information become identical with each other.

The processor may be further configured to execute the at least one instruction to update a parameter of the second neural network model to reduce a difference between first identification information acquired by inputting the feature information into the first neural network model and second identification information acquired by inputting the feature information into the second neural network model.

According to an aspect of the disclosure, a method for controlling an electronic apparatus, includes: quantizing a first neural network model for identifying an object stored in the electronic apparatus, to acquire a second neural network model; transmitting information on the second neural network model to an external apparatus; receiving, from the external apparatus, feature information for an image stored in the external apparatus acquired based on the second neural network model and identification information corresponding to the feature information; and training the second neural network model based on the received feature information and the received identification information.

The quantizing of the first neural network model may include: performing quantization for a first parameter corresponding to a first layer included in the first neural network model; and training the first neural network model based on learning data stored in the electronic apparatus, in a state wherein the first parameter is fixed, to update a second parameter corresponding to a second layer included in the first neural network model, the second layer being a subsequent layer of the first layer.

The quantizing of the first neural network model may include performing quantization for the updated second parameter to thereby acquire a parameter of a layer of the second neural network model corresponding to the second layer of the first neural network model.

The updating the second parameter may include training the first neural network model to thereby update the second parameter based on a plurality of images stored in the electronic apparatus, the received feature information, and the received identification information.

The method may further include: inputting the received feature information into the first neural network model to acquire first identification information, inputting the received feature information into the second neural network model to acquire second identification information, and based on a difference between the first identification information and the second identification information being greater than a threshold value, acquiring the feature information as learning data, the second neural network model being trained on the learning data.

The acquiring of the feature information as the learning data may include, based on the first identification information and the second identification information being different, acquiring the first identification information as identification information corresponding to the received feature information.

The method may further include: receiving a plurality of identification information, and a plurality of feature information respectively corresponding to the plurality of identification information, and based on quantities of each of the plurality of feature information differing from each other, adjusting the quantities of at least one of the feature information such that the quantities of each of the plurality of feature information become identical with each other.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 is a flow chart for illustrating a method of controlling an electronic apparatus according to an embodiment of the disclosure.

DESCRIPTION OF THE PREFERRED EMBODIMENTS

Figure 1:
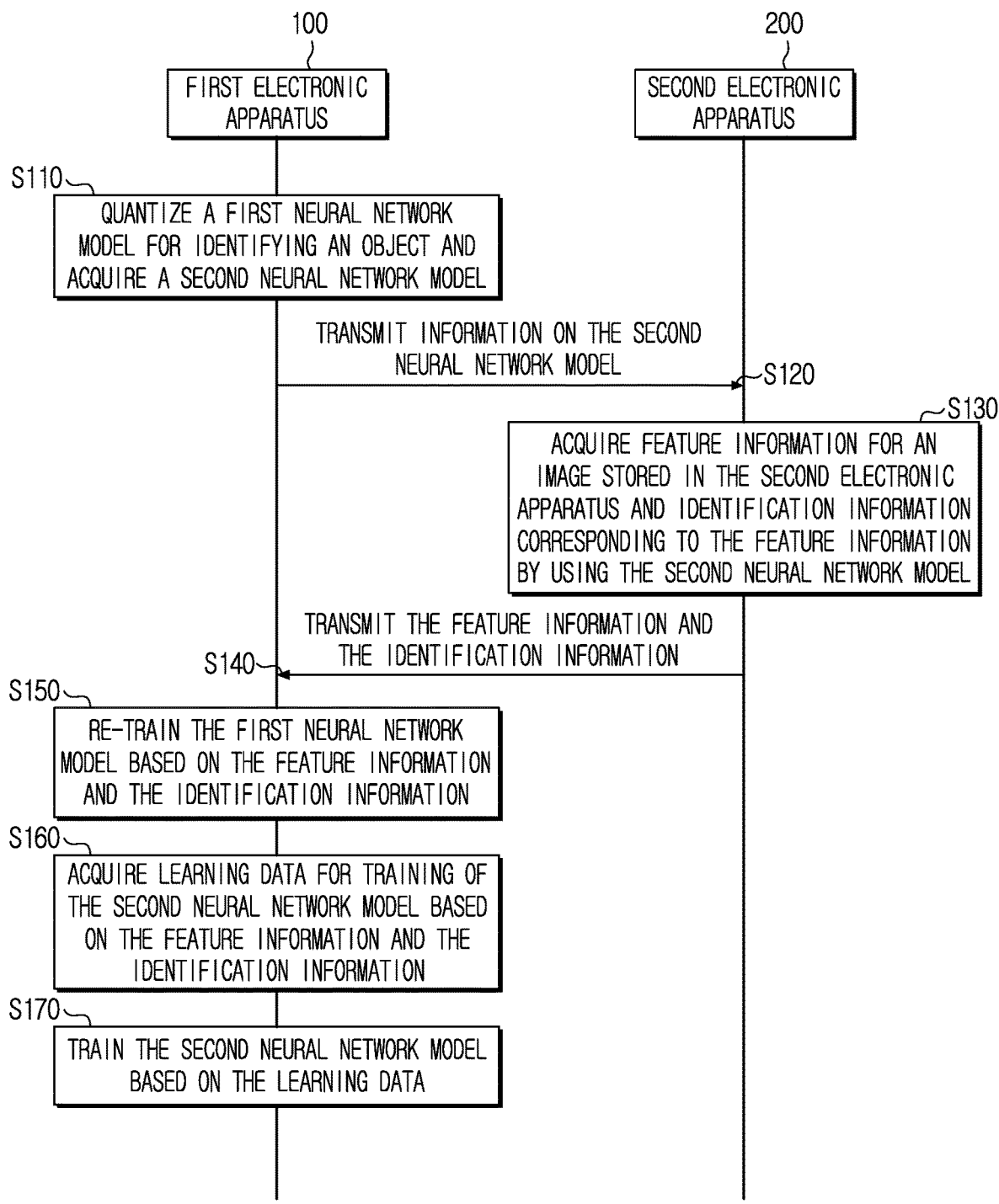
FIG. 1 is a flow chart for illustrating a method of acquiring a quantized neural network model according to an embodiment of the disclosure.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the ideas and the technical scopes disclosed herein. Meanwhile, when it is determined that in describing embodiments, detailed explanation of related known technologies may unnecessarily confuse the gist of the disclosure, the detailed explanation will be omitted.

Terms such as "first," "second," and the like may be used to describe various elements, but the terms are not intended to limit the elements. Such terms are used only to distinguish one element from another element.

Singular expressions include plural expressions, as long as they do not plainly mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a flow chart for illustrating a method of acquiring a quantized neural network model according to an embodiment of the disclosure.

Referring to FIG. 1, a first electronic apparatus 100 may quantize a first neural network model for identifying an object, to thereby acquire a second neural network model, in operation S110. For example, the first electronic apparatus 100 may be a server. The first neural network model is a model trained to identify an object included in an image, and it may be stored in advance in the first electronic apparatus 100. The first neural network model may include a first layer, and a second layer which is subsequent to the first layer. The second neural network model may include a third layer, and a fourth layer which is subsequent to the third layer. For example, the first layer and the third layer may be shallow layers, and the second layer and the fourth layer may be deep layers.

The first electronic apparatus 100 may perform quantization for a first parameter corresponding to the first layer. The first electronic apparatus 100 may train the first neural network model based on learning data in a state wherein the first parameter is fixed. Accordingly, the first electronic apparatus 100 may update a second parameter corresponding to the second layer.

The first electronic apparatus 100 may perform quantization for the updated second parameter, and acquire a fourth parameter of the second neural network model, to correspond to the fourth layer. A third parameter of the third layer of the second neural network model may be identical to the first parameter of the first layer of the first neural network model. The second neural network model can then be acquired based on these parameters. Accordingly, the second neural network model may be a model wherein a subsequent layer, such as the fourth layer, became lighter compared to a corresponding subsequent layer, such as the second layer, of the first neural network model. The first electronic apparatus 100 may store information on the first neural network model and the second neural network model.

The first electronic apparatus 100 may transmit the information on the second neural network model to a second electronic apparatus 200 in operation S120. The information on the second neural network model may include information on the parameters of the second neural network model. However, this is merely an example, and the information on the second neural network model may include information for downloading of the second neural network model.

The second electronic apparatus 200 may acquire feature information on an image stored in the second electronic apparatus 200 and identification information corresponding to the feature information by using the second neural network model in operation S130. For example, the second electronic apparatus 200 may be a user terminal. The second electronic apparatus 200 may input a first image selected by a user into the second neural network model, and acquire feature information on an object included in the first image. The feature information may mean feature values, feature vectors, or intermediate features. Also, the second electronic apparatus 200 may input the first image into the second neural network model, and acquire identification information for an object included in the first image, and a confidence value indicating the reliability of the identification information.

The second electronic apparatus 200 may acquire label data for training of the second neural network model. This acquisition may be selective, based on the confidence value corresponding to the identification information. For example, the second electronic apparatus 200 may input the first image into the second neural network model, and acquire first identification information for a first object included in the first image, and a first confidence value corresponding to the first identification information. When the first confidence value is greater than a predetermined threshold value, the second electronic apparatus 200 may acquire the first identification information as label data corresponding to the first object. In contrast, when the first confidence value is smaller than or equal to the predetermined value, the second electronic apparatus 200 may not acquire the first identification information as label data corresponding to the first object.

The second electronic apparatus 200 may acquire label data based on a user interaction. For example, the second electronic apparatus 200 may request a user feedback for the first identification information for the first object acquired by using the second neural network model. The second electronic apparatus 200 may output a message inquiring whether the first identification information corresponds to the first object. That is, the second electronic apparatus 200 may inquire to a user whether the first identification information is correct as identification information for the first object. When, according to a response of the user, the first identification information does not correspond to the first object, the second electronic apparatus 200 may acquire a user instruction for correcting the first identification information. Accordingly, the second electronic apparatus 200 may acquire the first identification information corrected by the user as the label data corresponding to the first object.

The second electronic apparatus 200 may selectively enable or disable performance of the user interaction based on the confidence value. For example, the second electronic apparatus 200 may perform a user interaction only when the confidence value is smaller than or equal to the predetermined value. That is, when the confidence value is greater than the predetermined value, the second electronic apparatus 200 may disable performance of a user interaction. Accordingly, user convenience can be improved.

The second electronic apparatus 200 may identify feature information corresponding to the acquired identification information. The second electronic apparatus 200 may match the identified feature information and identification information and store them in correspondence to each other. As will be described below, the feature information and the identification information may become learning data for training of the second neural network model.

The second electronic apparatus 200 may transmit the feature information and the identification information to the first electronic apparatus 100 in operation S140. The second electronic apparatus 200 may transmit feature information corresponding to an image rather than the image stored in the second electronic apparatus 200 to the first electronic apparatus 100. Accordingly, privacy of the user of the second electronic apparatus 200 can be protected.

The first electronic apparatus 100 may re-train the first neural network model based on the feature information and the identification information received from the second electronic apparatus 200 in operation S150. Here, the first electronic apparatus 100 may update the second parameter corresponding to the second layer of the first neural network model while keeping fixed the first parameter corresponding to the first layer of the first neural network model. For example, the first electronic apparatus 100 may input first feature information into the second layer of the first neural network model, and acquire first identification information. The first electronic apparatus 100 may update the second parameter corresponding to the second layer such that a difference between the first identification information acquired from the first neural network model and the first label data received from the second electronic apparatus 200 is reduced. Here, the difference between the acquired first identification information and the received first label data may be reduced to correspond to a certain value.

The first electronic apparatus 100 may re-train the first neural network model by using together the feature information and the identification information received from the second electronic apparatus 200, and the previous learning data that was used for training of the first neural network model before receiving the feature information and the identification information from the second electronic apparatus 200. For example, the first electronic apparatus 100 may update the second parameter by using an image included in the previous learning data.

The first electronic apparatus 100 may receive feature information and identification information acquired through the second neural network model from a plurality of external apparatuses (e.g., a third electronic apparatus, a fourth electronic apparatus, etc.). Then, the first electronic apparatus 100 may re-train the first neural network model based on the acquired feature information and identification information.

The first electronic apparatus 100 may acquire the learning data for training of the second neural network model based on the feature information and the identification information in operation S160. For example, the first electronic apparatus 100 may input the feature information into the second layer of the first neural network model, and acquire the first identification information. The first electronic apparatus 100 may input the feature information into the fourth layer of the second neural network model, and acquire second identification information. The first electronic apparatus 100 may compare the first identification information and the second identification information to determine a difference therebetween. Based on the determined difference between the first identification information and the second identification information being greater than a predetermined threshold value, the first electronic apparatus 100 may acquire the feature information as the learning data. When the first identification information and the second identification information are different, the first electronic apparatus 100 may acquire the first identification information as identification information corresponding to the feature information.

Based on the difference between the first identification information and the second identification information being less than or equal to the threshold value, the first electronic apparatus 100 may not acquire the feature information as the learning data. That is, the first electronic apparatus 100 may determine that it is unnecessary to acquire feature information wherein inference results of the first neural network model and the second neural network model are expressed to be similar as the learning data. Accordingly, the first electronic apparatus 100 can maximize the learning effect of the second neural network model just with a small amount of learning data.

The first electronic apparatus 100 may adjust a quantity of feature information—by which is meant a quantity of data elements in the feature information—acquired as the learning data. The learning data may include a plurality of feature information corresponding to the plurality of identification information. For example, the learning data may include a plurality of first feature information corresponding to the first identification information, and a plurality of second feature information corresponding to the second identification information. Here, based on the quantities of each of the feature information for the plurality of respective identification information differing from each other, the first electronic apparatus 100 may adjust the quantities of the feature information such that the quantities of each of the feature information for the respective identification information become identical with each other. For example, when the quantity of the plurality of first feature information is greater than the quantity of the plurality of second feature information, the first electronic apparatus 100 may remove some of the plurality of first feature information. Alternatively, the first electronic apparatus 100 may copy some of the second feature information and increase the quantity of the second feature information, such that the quantities of the first feature information and the second feature information become identical.

The first electronic apparatus 100 may train the second neural network model based on the learning data in operation S170. For example, the first electronic apparatus 100 may input a feature vector into the second layer of the first neural network model, and acquire the first identification information. The first electronic apparatus 100 may input a feature vector into the fourth layer of the second neural network model, and acquire the second identification information. The first electronic apparatus 100 may acquire a first loss value based on the first identification information and the second identification information. In order that the first loss value corresponds to a certain value, the first electronic apparatus 100 may update the fourth parameter corresponding to the fourth layer of the second neural network model such that the first loss value is reduced. The first electronic apparatus 100 may compare the second identification information and the label data, and acquire a second loss value. In order that the second loss value corresponds to a certain value, the first electronic apparatus 100 may update the fourth parameter of the second neural network model such that the second loss value is reduced.

Herein, in the disclosure, the first electronic apparatus 100 may also be referred to as the electronic apparatus, and the second electronic apparatus 200 may also be referred to as the external apparatus, for the convenience of explanation.

Figure 2:
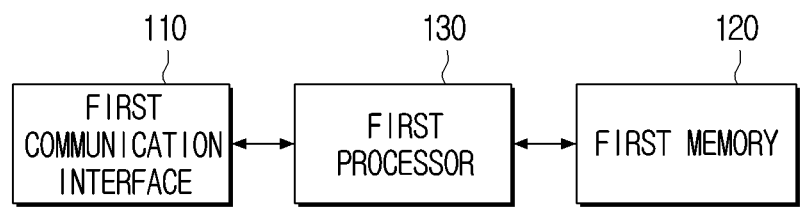
FIG. 2 is a block diagram illustrating a configuration of a first electronic apparatus according to an embodiment of the disclosure.

FIG. 2 is a block diagram for illustrating a configuration of a first electronic apparatus according to an embodiment of the disclosure.

Referring to FIG. 2, the first electronic apparatus 100 may include a first communication interface 110, a first memory 120, and a first processor 130. The first communication interface 110 may include at least one communication circuit, and perform communication with various types of external apparatuses or external servers. For example, the first communication interface 110 may receive, from the second electronic apparatus 200, feature information and identification information for an image stored in the second electronic apparatus 200. In addition, the first communication interface 110 may transmit information on the second neural network model to the second electronic apparatus 200.

The first communication interface 110 may include at least one of a Wi-Fi communication module, a cellular communication module, a 3rd Generation (3G) mobile communication module, a 4th Generation (4G) mobile communication module, a 4G Long Term Evolution (LTE) communication module, a 5th Generation (5G) mobile communication module, or a wired Ethernet.

The first memory 120 may store an operating system (OS) for controlling the overall operations of the components of the first electronic apparatus 100, and instructions or data related to the components of the first electronic apparatus 100. The first memory 120 may store information on the first neural network model and the second neural network model. The first memory 120 may store learning data for training of the first neural network model and the second neural network model. The learning data may include an image, feature information corresponding to the image, and label data (or ground truth) indicating identification information corresponding to the feature information. The first memory 120 may be implemented as a non-volatile memory (ex: a hard disc, a solid state drive (SSD), a flash memory), a volatile memory, etc.

The first processor 130 may be electronically connected with the first memory 120, and control the overall functions and operations of the first electronic apparatus 100. The first processor 130 may quantize the first neural network model, and acquire the second neural network model. The first processor 130 may perform quantization for the first parameter corresponding to the first layer of the first neural network model. The first processor 130 may update the second parameter corresponding to the second layer, which is a subsequent layer of the first layer, based on the learning data stored in the first memory 120, while keeping the first parameter fixed.

The first processor 130 may perform quantization for the second parameter, and acquire the second neural network model. The third layer of the second neural network model may have the same parameter as the first layer of the first neural network model. The fourth layer of the second neural network model may be a layer reflecting a quantizing of the second layer of the first neural network model.

The first processor 130 may control the first communication interface 110 to transmit the information on the second neural network model to the second electronic apparatus 200. The first processor 130 may receive feature information and identification information acquired based on the second neural network model from the external apparatus through the first communication interface 110.

The first processor 130 may re-train the first neural network model based on the learning data stored in the first memory 120, and the feature information and the identification information received from the second external apparatus 200. Accordingly, the second parameter corresponding to the second layer of the first neural network model may be updated.

The first processor 130 may input the feature information into the first neural network model, and acquire the first identification information. The first processor 130 may input the feature information into the second neural network model, and acquire the second identification information. Based on the difference between the first identification information and the second identification information being greater than the threshold value, the first processor 130 may acquire the feature information as the learning data for training of the second neural network model. When the first identification information and the second identification information are different, the first processor 130 may acquire the first identification information but not the second identification information as identification information corresponding to the feature information.

When the numbers of the feature information for the plurality of respective identification information included in the learning data for training of the second neural network model are different, the first processor 130 may adjust the numbers of the feature information such that the numbers of the identification information and the feature information become identical.

The first processor 130 may train the second neural network model based on the feature information and the identification information. The first processor 130 may train the second neural network model to thereby reduce the difference between the first identification information acquired by inputting the feature information into the first neural network model and the second identification information acquired by inputting the feature information into the second neural network model. Here, the difference between the first identification information and the second identification information may be reduced to correspond to a certain value. Accordingly, the parameter of the second neural network model may be updated.

A function related to artificial intelligence according to the disclosure is operated through the first processor 130 and the first memory 120. The first processor 130 may consist of one or a plurality of processors. Here, the one or plurality of processors may be generic-purpose processors like CPUs, APs, and digital signal processors (DSPs), graphic-dedicated processors like GPUs and vision processing units (VPUs), or artificial intelligence-dedicated processors like NPUs. The one or plurality of processors perform control such that input data is processed according to a predefined operation rule or an artificial intelligence model stored in the first memory 120. Alternatively, when the one or plurality of processors are artificial intelligence-dedicated processors, the artificial intelligence-dedicated processors may be designed as a hardware structure specified for processing of a specific artificial intelligence model.

A predefined operation rule or an artificial intelligence model are characterized in being made through learning. Here, being made through learning means that a basic artificial intelligence model is trained by using a plurality of learning data by a learning algorithm, and a predefined operation rule or an artificial intelligence model set to perform a desired characteristic (or, purpose) is made. Such learning may be performed in an apparatus wherein artificial intelligence is performed itself according to the disclosure, or performed through a separate server and/or system. As examples of learning algorithms, there are supervised learning, unsupervised learning, semi-supervised learning, or reinforcement learning, but learning algorithms are not limited to the aforementioned examples.

An artificial intelligence model may be made through learning. An artificial intelligence model may consist of a plurality of neural network layers. Each of the plurality of neural network layers has a plurality of weight values, and performs a neural network operation through the operation result of the previous layer and an operation among the plurality of weight values. The plurality of weight values included by the plurality of neural network layers may be optimized by the learning result of the artificial intelligence model. For example, the plurality of weight values may be updated such that a loss value or a cost value acquired at the artificial intelligence model during a learning process is reduced or minimized.

An artificial neural network may include a deep neural network (DNN), and there are, for example, a convolutional neural network (CNN), a deep neural network (DNN), a recurrent neural network (RNN), a generative adversarial network (GAN), a restricted Boltzmann Machine (RBM), a deep belief network (DBN), a bidirectional recurrent deep neural network (BRDNN), or deep Q-networks, etc., but the disclosure is not limited to the aforementioned examples.

Meanwhile, the electronic apparatus 100 may include an adaptive echo canceller (AEC) module for pre-processing a user voice, a noise suppression (NS) module, an end-point detection (EPD) module, or an automatic gain control (AGC) module. Also, the electronic apparatus 100 may include a digital signal processor (DSP) that changes an analog voice signal into a digital signal, or changes a stored digital image or digital voice signal into an analog signal.

Figure 3:
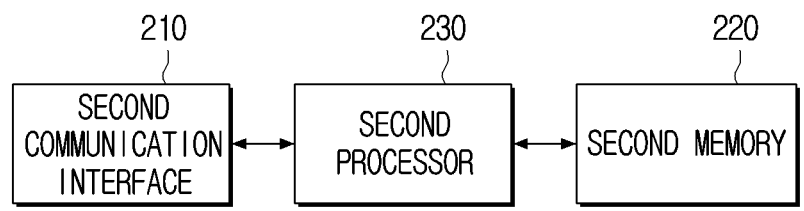
FIG. 3 is a block diagram illustrating a configuration of a second electronic apparatus according to an embodiment of the disclosure.

FIG. 3 is a block diagram illustrating a configuration of a second electronic apparatus according to an embodiment of the disclosure.

Referring to FIG. 3, the second electronic apparatus 200 may include a second communication interface 210, a second memory 220, and a second processor 230. The second electronic apparatus 200 may further include a user input part for receiving an input of a user instruction, and a display.

The second communication interface 210 may include at least one communication circuit, and perform communication with various types of external apparatuses or external servers. For example, the second communication interface 210 may receive information on the second neural network model from the first electronic apparatus 100. Alternatively, the second communication interface 210 may transmit feature information and identification information acquired based on the second neural network model to the first electronic apparatus 100.

The second communication interface 210 may include at least one of a Wi-Fi communication module, a cellular communication module, a 3rd Generation (3G) mobile communication module, a 4th Generation (4G) mobile communication module, a 4G Long Term Evolution (LTE) communication module, or a 5th Generation (5G) mobile communication module.

The second memory 220 may store an operating system (OS) for controlling the overall operations of the components of the second electronic apparatus 200, and instructions or data related to the components of the second electronic apparatus 200. The second memory 220 may store information on the second neural network model. The second memory 220 may store a plurality of images. The second memory 220 may be implemented as a non-volatile memory (ex: a hard disc, a solid state drive (SSD), a flash memory), a volatile memory, etc.

The second processor 230 may be electronically connected with the second memory 220, and control the overall functions and operations of the second electronic apparatus 200. The second processor 230 may acquire feature information for an image stored in the second memory 220, and identification information corresponding to the feature information by using the second neural network model. For example, the second processor 230 may input a first image selected by a user into the second neural network model, and acquire feature information on an object included in the first image. Also, the second processor 230 may input the first image into the second neural network model, and acquire identification information for an object included in the first image, and a confidence value indicating the reliability of the identification information.

The second processor 230 may acquire label data for training of the second neural network model based on the confidence value corresponding to the identification information. For example, the second processor 230 may input the first image into the second neural network model, and acquire first identification information for a first object included in the first image, and a first confidence value corresponding to the first identification information. When the first confidence value is greater than a predetermined threshold value, the second processor 230 may acquire the first identification information as label data corresponding to the first object. In contrast, when the first confidence value is smaller than or equal to the predetermined value, the second processor 230 may not acquire the first identification information as label data corresponding to the first object.

The second processor 230 may acquire label data based on a user interaction. For example, the second processor 230 may request a user feedback for the first identification information for the first object acquired by using the second neural network model. The second processor 230 may output a message inquiring whether the first identification information corresponds to the first object. The second processor 230 may acquire a user instruction for correcting the first identification information. The second processor 230 may acquire the first identification information corrected by the user as label data corresponding to the first object.

The second processor 230 may selectively enable or disable performance of the user interaction based on the confidence value. For example, the second processor 230 may perform a user interaction only when the confidence value is smaller than or equal to the predetermined value. That is, when the confidence value is greater than the predetermined value, the second processor 230 may disable performance of a user interaction. Accordingly, user convenience can be improved.

The second processor 230 may control the second communication interface 210 to transmit the feature information and the identification information to the first electronic apparatus 100. That is, the second processor 230 may transmit feature information corresponding to an image rather than the image stored in the second memory 220 to the first electronic apparatus 100. Accordingly, privacy of the user of the second electronic apparatus 200 can be protected.

Figure 4:
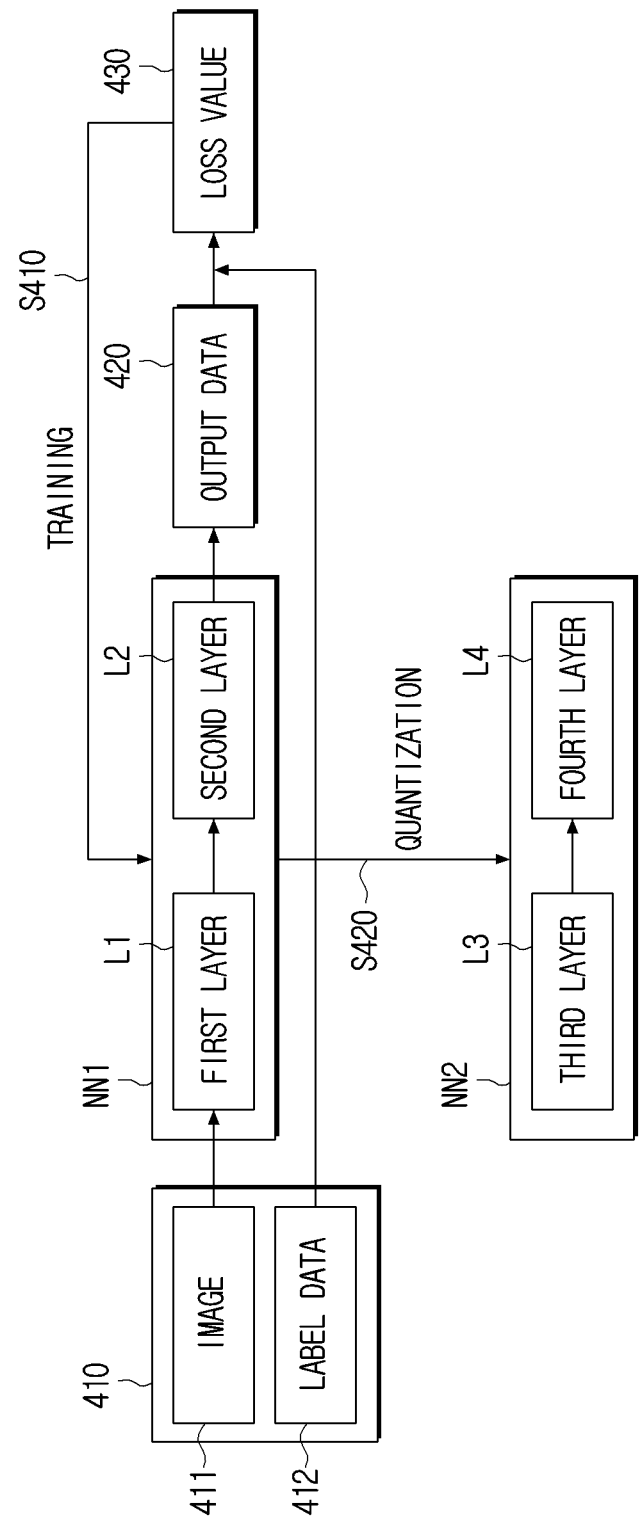
FIG. 4 is a diagram for illustrating a method of acquiring a second neural network model according to an embodiment of the disclosure.

FIG. 4 is a diagram for illustrating a method of acquiring a second neural network model according to an embodiment of the disclosure.

Referring to FIG. 4, the first neural network model NN1 may include a first layer L1 and a second layer L2 subsequent to the first layer L1. The first electronic apparatus 100 may perform quantization for the first layer L1.

In a state wherein the first parameter of the quantized first layer L1 is fixed, the first electronic apparatus 100 may perform fine tuning for the second layer L2. The first electronic apparatus 100 may train the first neural network model NN1 based on learning data 410 in operation S410. The learning data 410 may include an image 411 and label data 412 corresponding to the image 411. The label data 412 may include identification information acquired from a user.

The label data 412 may also, or alternatively, include a ground truth stored in advance in the first electronic apparatus 100.

The first electronic apparatus 100 may input the image 411 into the first neural network model NN1 including the first layer L1 and the second layer L2, and acquire output data 420. The output data 420 may include identification information corresponding to an object included in the image 411, and a confidence value indicating the reliability of the identification information.

The first electronic apparatus 100 may acquire a loss value 430 based on the output data 420 and the label data 412. The first electronic apparatus 100 may train the first neural network model NN1 such that the loss value 430 becomes smaller. Here, the first parameter of the quantized first layer L1 is fixed, and the second parameter of the second layer L2 may be updated.

The first electronic apparatus 100 may quantize the first neural network model NN1 and thereby acquire the second neural network model NN2 in operation S420. The first electronic apparatus 100 may quantize the second parameter corresponding to the second layer L2 of the first neural network model NN1, and acquire the fourth layer L4 of the second neural network model NN2. The second parameter corresponding to the third layer L3 of the second neural network model NN2 may be identical to the first parameter corresponding to the first layer L1 of the first neural network model NN1.

Figure 5:
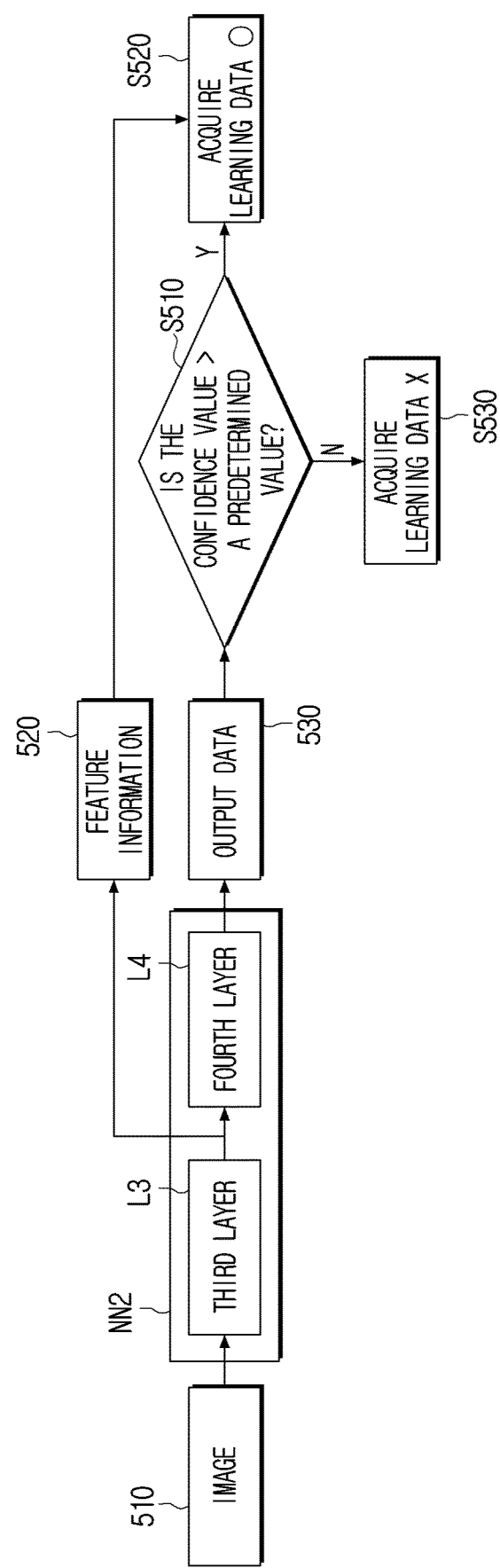
FIG. 5 is a diagram for illustrating a method of acquiring learning data according to an embodiment of the disclosure.

FIG. 5 is a diagram for illustrating a method of acquiring learning data according to an embodiment of the disclosure.

Referring to FIG. 5, the second electronic apparatus 200 may input an image 510 into the second neural network model NN2, and acquire feature information 520 corresponding to the image 510 and output data 530. Specifically, the second electronic apparatus 200 may input the image 510 into the third layer L3 and acquire the feature information 520. The second electronic apparatus 200 may input the feature information 520 into the fourth layer L4 and acquire the output data 530. The image 510 may be an image stored in the second electronic apparatus 200, or selected by a user. The output data 530 may include identification information corresponding to an object included in the image 510, and a confidence value indicating the reliability of the identification information.

The second electronic apparatus 200 may determine whether the confidence value greater than a predetermined threshold value in operation S510. When the confidence value is greater than the predetermined threshold value ("Yes" in operation S510), the second electronic apparatus 200 may acquire feature information and identification information corresponding to the confidence value as learning data in operation S520. When the confidence value is less than or equal to the predetermined threshold value ("No" in operation S510), the second electronic apparatus 200 may not acquire the feature information and the identification information corresponding to the confidence value as the learning data in operation S530.

Figure 6:
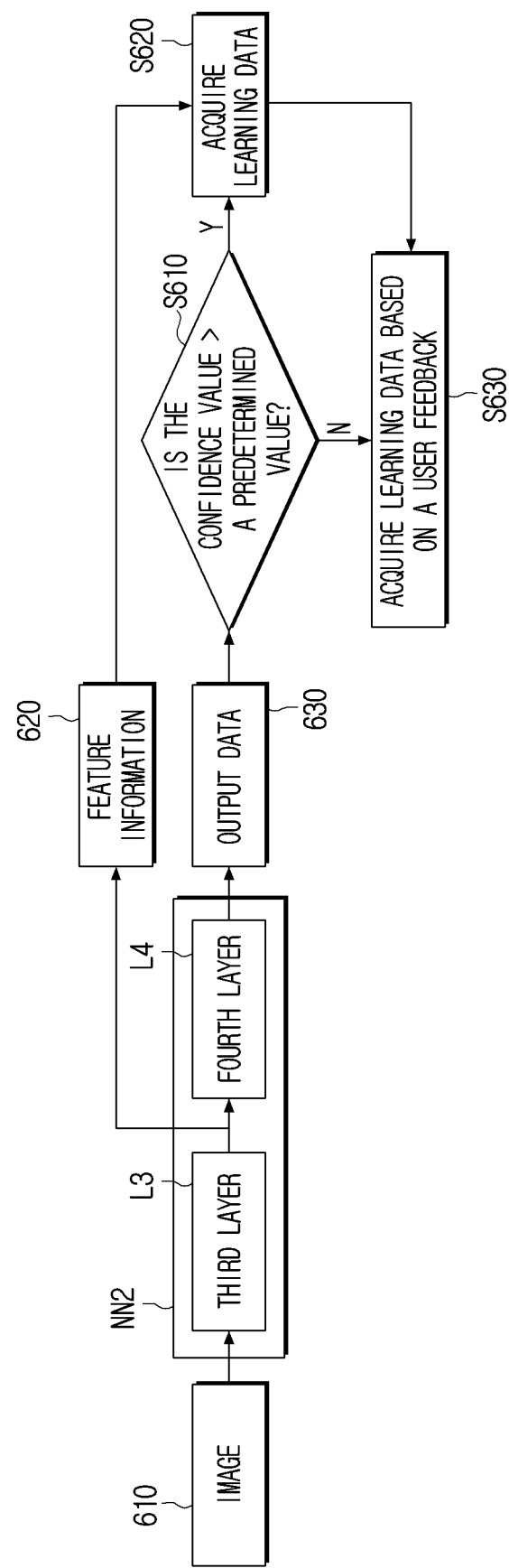
FIG. 6 is a diagram for illustrating a method of acquiring learning data according to another embodiment of the disclosure.

FIG. 6 is a diagram for illustrating a method of acquiring learning data according to another embodiment of the disclosure.

Referring to FIG. 6, the second electronic apparatus 200 may input an image 610 into the second neural network model NN2, and acquire feature information 620 corresponding to the image 610 and output data 630. Specifically, the second electronic apparatus 200 may input the image 610 into the third layer L3 and acquire the feature information 620. The second electronic apparatus 200 may input the feature information 620 into the fourth layer L4 and acquire the output data 630. The image 610 may be an image stored in the second electronic apparatus 200, or selected by a user. The output data 630 may include identification information corresponding to an object included in the image 610, and a confidence value indicating the reliability of the identification information.

The second electronic apparatus 200 may determine whether the confidence value greater than a predetermined threshold value in operation S610. When the confidence value is greater than the predetermined threshold value ("Yes" in operation S610), the second electronic apparatus 200 may acquire feature information and identification information corresponding to the confidence value as learning data in operation S620. When the confidence value is less than or equal to the predetermined threshold value ("No" in operation S610), the second electronic apparatus 200 may acquire learning data based on a user feedback in operation S630. For example, the second electronic apparatus 200 may acquire identification information corresponding to feature information from a user. The second electronic apparatus 200 may match the feature information corresponding to the confidence value less than or equal to the predetermined value and the identification information acquired from the user and store them. In certain embodiments, only when the confidence value is less than or equal to the predetermined threshold value is learning data acquired based on a user feedback. However, in the illustrated example of FIG. 6, even when the confidence value is greater than the predetermined threshold value, if a user feedback exists, the second electronic apparatus 200 may acquire learning data based on the user feedback.

Figure 7:
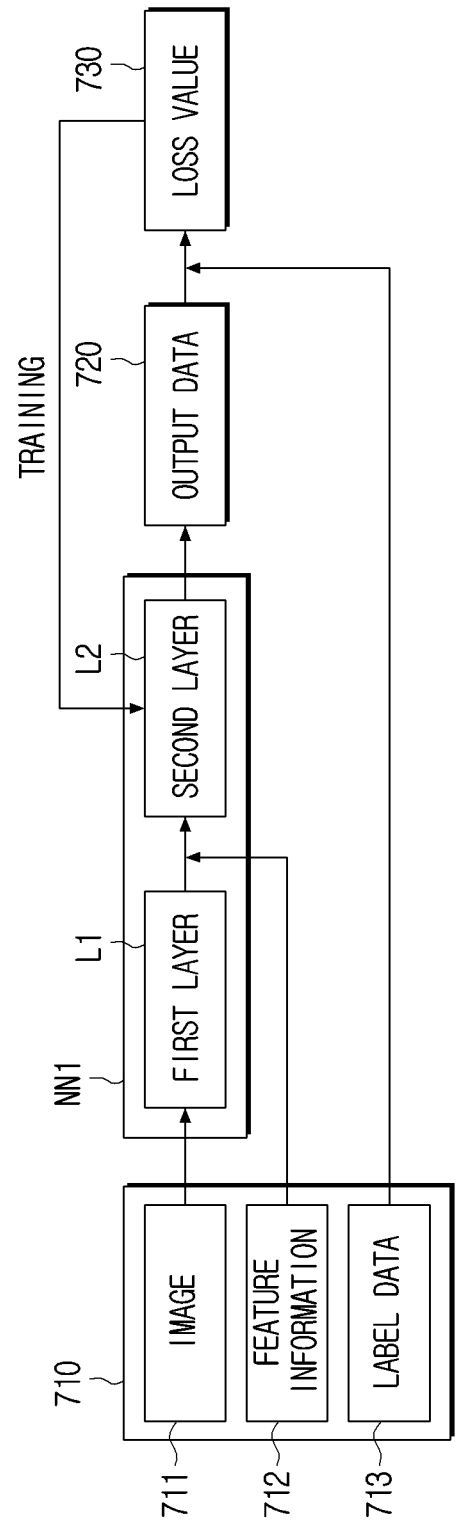
FIG. 7 is a diagram for illustrating a method of re-training a first neural network model according to an embodiment of the disclosure.

FIG. 7 is a diagram for illustrating a method of re-training a first neural network model according to an embodiment of the disclosure.

Referring to FIG. 7, the first electronic apparatus 100 may re-train the first neural network model NN1 based on learning data 710. The learning data 710 may include an image 711, feature information 712 received from the second electronic apparatus 200, and label data 713 corresponding to the feature information 712. The label data 713 may include identification information acquired from a user. The label data 713 may also, or alternatively, include a ground truth stored in advance in the first electronic apparatus 100.

The first electronic apparatus 100 may input the image 711 into the first neural network model NN1 and acquire output data 720. The first electronic apparatus 100 may additionally or alternatively input the feature information 712 into the second layer L2 to acquire output data 720. The first electronic apparatus 100 may acquire a loss value 730 based on the output data 720 and the label data 713.

The first electronic apparatus 100 may train the first neural network model NN1 such that the loss value 730 becomes smaller. Here, the loss value 730 may become smaller to correspond to a certain value, and the first parameter of the first layer L1 may be maintained while the second parameter of the second layer L2 may be updated. Accordingly, the first electronic apparatus 100 may train the first neural network model NN1 such that features provided by the user of the second electronic apparatus 200 are reflected. That is, the first electronic apparatus 100 may train the first neural network model NN1 to become more personalized for a user.

Figure 8:
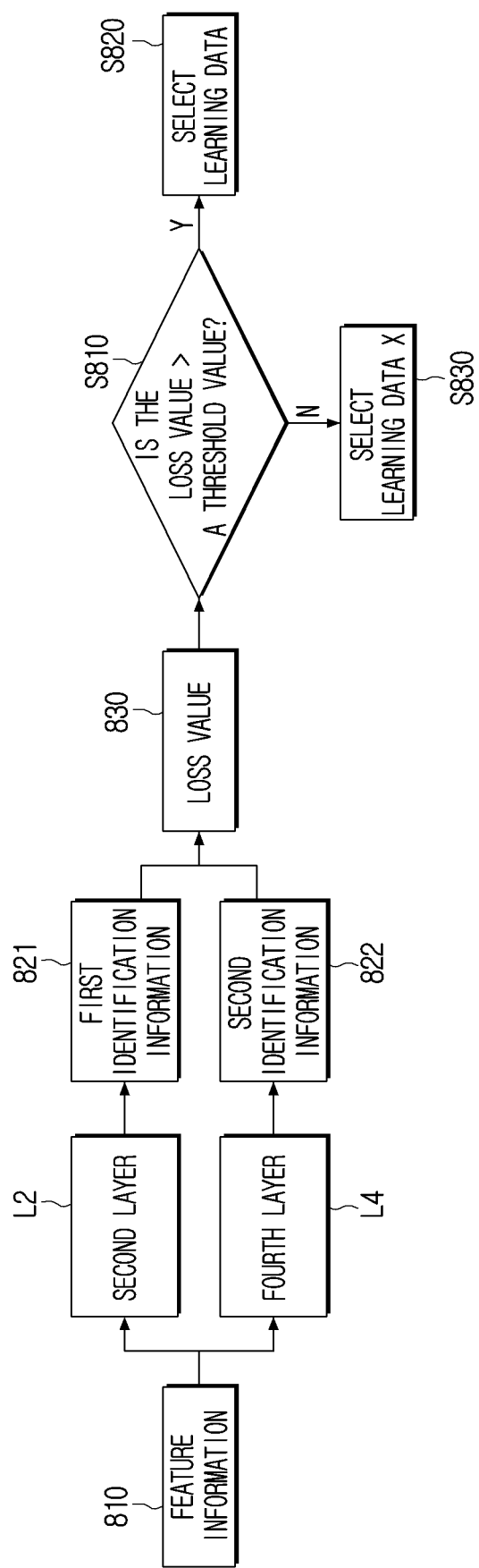
FIG. 8 is a diagram for illustrating a method of acquiring learning data according to an embodiment of the disclosure.

FIG. 8 is a diagram for illustrating a method of acquiring learning data according to an embodiment of the disclosure. More specifically, FIG. 8 is a diagram for illustrating a method of selecting some data among learning data acquired according to FIG. 5 and FIG. 6.

Referring to FIG. 8, the first electronic apparatus 100 may input feature information 810 included in learning data into the second layer L2 of the first neural network model, and acquire first identification information 821. The first electronic apparatus 100 may input the feature information 810 into the fourth layer L4 of the second neural network model, and acquire second identification information 822. The first electronic apparatus 100 may acquire a loss value 830 based on the first identification information 821 and the second identification information 822. The first electronic apparatus 100 may determine whether the loss value is greater than a predetermined threshold value in operation S810. Based on the loss value being greater than the predetermined threshold value ("Yes" in operation S810), the first electronic apparatus 100 may select the feature information 810 as learning data in operation S820. Here, the first electronic apparatus 100 may acquire the first identification information 821 as identification information corresponding to the feature information 810. The first electronic apparatus 100 may match the first identification information 821 with the feature information 810 and store them. Based on the loss value being less than or equal to the predetermined threshold value ("No" in operation S810), the first electronic apparatus 100 may not select the feature information 810 as the learning data in operation S830.

Figure 9:
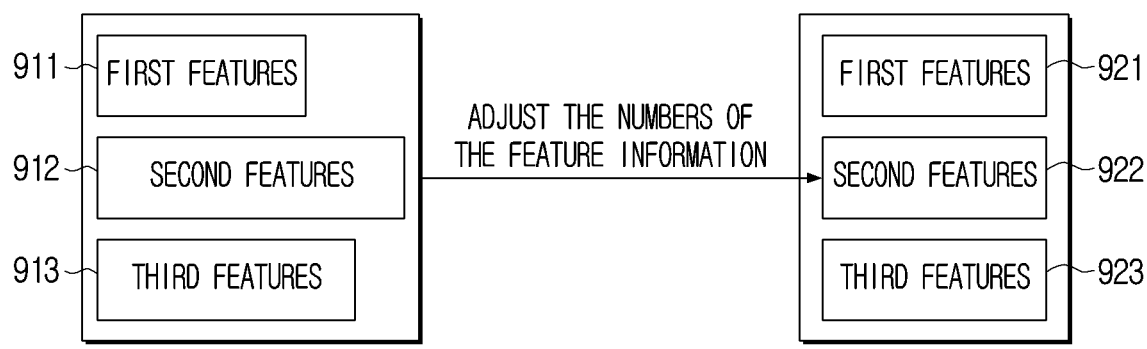
FIG. 9 is a diagram for illustrating a method of pre-processing learning data according to an embodiment of the disclosure.

FIG. 9 is a diagram for illustrating a method of pre-processing learning data according to an embodiment of the disclosure.

Referring to FIG. 9, learning data may include a plurality of feature information respectively corresponding to a plurality of identification information. For example, learning data may include a plurality of first feature information 911 corresponding to the first identification information, a plurality of second feature information 912 corresponding to the second identification information, and a plurality of third feature information 913 corresponding to the third identification information. Here, the quantities of the first feature information 911, the second feature information 912, and the third feature information 913 may be different. For example, the quantity of the second feature information 912 may be greater than the quantity of the third feature information 913, and the quantity of the third feature information 913 may be greater than the quantity of the first feature information 911.

The first electronic apparatus 100 may adjust the quantities of the feature information such that the quantities of each of the feature information for the respective identification information become identical. For example, the first electronic apparatus 100 may copy some of the first feature information 911, which has the least quantity of information, and increase the quantity of the first feature information 911. Alternatively or additionally, the first electronic apparatus 100 may remove some of the second feature information 912, which has the greatest quantity of information, and decrease the quantity of the second feature information 912. Accordingly, the first electronic apparatus 100 may acquire adjusted first feature information 921, adjusted second feature information 922, and adjusted third feature information 923, at least one of which has been adjusted in quantity.

Figure 10:
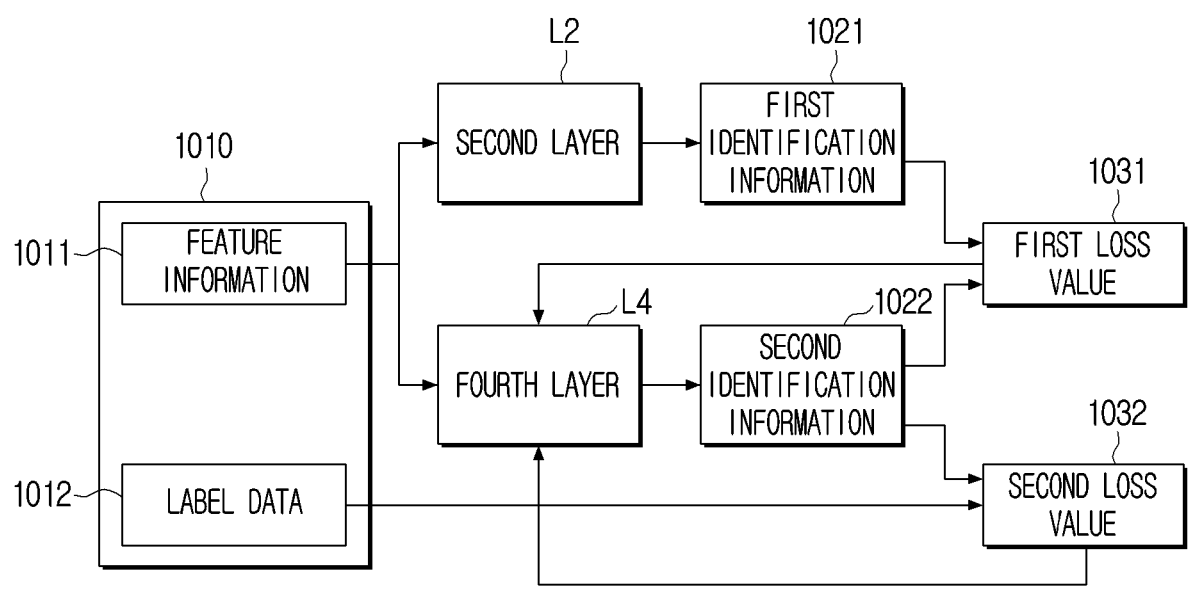
FIG. 10 is a diagram for illustrating a method of training a second neural network model according to an embodiment of the disclosure.

FIG. 10 is a diagram for illustrating a method of training a second neural network model according to an embodiment of the disclosure.

Referring to FIG. 10, learning data 1010 may include feature information 1011, and label data 1012 which is identification information corresponding to the feature information 1011. The first electronic apparatus 100 may input the feature information 1011 into the second layer L2 of the first neural network model, and acquire first identification information 1021. The first electronic apparatus 100 may input the feature information 1011 into the fourth layer L4 of the second neural network model, and acquire second identification information 1022.

The first electronic apparatus 100 may acquire a first loss value 1031 based on the first identification information 1021 and the second identification information 1022. The first electronic apparatus 100 may acquire a second loss value 1032 based on the second identification information 1022 and the label data 1012. The first electronic apparatus 100 may update the parameter of the fourth layer L4 of the second neural network model such that the first loss value 1031 corresponds to a certain first value. The first electronic apparatus 100 may update the parameter of the fourth layer L4 of the second neural network model such that the second loss value 1032 corresponds to a certain second value.

FIG. 11 is a flow chart for illustrating a method of controlling an electronic apparatus according to an embodiment of the disclosure.

Referring to FIG. 11, an electronic apparatus may quantize a first neural network model for identifying an object, to thereby acquire a second neural network model, in operation S1110. Here, the electronic apparatus may be the aforementioned first electronic apparatus 100. The first neural network model may be a neural network model trained to identify an object included in an image. The electronic apparatus may perform quantization for a first parameter corresponding to a first layer of the first neural network model. The electronic apparatus may update a second parameter corresponding to a second layer, which is a subsequent layer of the first layer, based on pre-stored learning data, in a state wherein the first parameter is fixed. Then, the electronic apparatus may perform quantization for the second parameter, thereby acquiring the second neural network model.

The electronic apparatus may transmit information on the second neural network model to an external apparatus, in operation S1120. Here, the external apparatus may be the aforementioned second electronic apparatus 200.

The electronic apparatus may receive feature information for an image acquired based on the second neural network model, and identification information corresponding to the feature information from the external apparatus, in operation S1130. As embodiments for a method for the external apparatus to acquire feature information and identification information was described above in FIG. 5 and FIG. 6, an overlapping explanation will be omitted.

The electronic apparatus may train the second neural network model based on the received feature information and identification information, in operation S1140. As embodiments for various aspects of a method of training neural network models was described above in FIG. 7 to FIG. 10, an overlapping explanation will be omitted.

The various embodiments described above may be implemented in a recording medium that can be read by a computer or an apparatus similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

Computer instructions for performing processing operations according to the aforementioned various embodiments of the disclosure may be stored in a non-transitory computer-readable medium. Computer instructions stored in such a non-transitory computer-readable medium may make the processing operations according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

A storage medium that is readable by machines may be provided in the form of a non-transitory storage medium. Here, the term 'a non-transitory storage medium' only means that the apparatus is a tangible apparatus, and does not include a signal (e.g.: an electronic wave), and the term does not distinguish a case wherein data is stored semi-permanently in a storage medium and a case wherein data is stored temporarily. For example, 'a non-transitory storage medium' may include a buffer wherein data is temporarily stored.

According to an embodiment, a method according to the various embodiments disclosed herein may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed directly on-line (e.g.: download or upload) through an application store (e.g.: Play Store™), or between two user apparatuses (e.g.: smartphones). In the case of on-line distribution, at least a portion of a computer program product (e.g.: a downloadable app) may be stored in a storage medium readable by machines such as the server of the manufacturer, the server of the application store, and the memory of the relay server at least temporarily, or may be generated temporarily.

While embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic apparatus comprising:
a communication interface;
memory storing at least one instruction; and
at least one processor,
wherein the at least one instruction, when executed by the at least one processor individually or collectively, causes the electronic device to:
quantize a first neural network model for identifying an object, to acquire a second neural network model,
quantize a first parameter corresponding to a first layer included in the first neural network model for identifying an object;
train the first neural network model based on training data while the first parameter remains fixed, to update a second parameter corresponding to a second layer of the first neural network model, which is a subsequent layer of the first neural network model from the first layer;
quantize the updated second parameter to obtain a fourth parameter;
obtain a quantized second neural network model comprising a third layer including a third parameter identical to the first parameter, and a fourth layer including the fourth parameter,
control the communication interface to transmit information on the second neural network model to an external apparatus,
receive, from the external apparatus, feature information for an image stored in the external apparatus acquired based on the second neural network model, and identification information corresponding to the feature information, and
train the second neural network model to be personalized for a user of the external apparatus, based on the received feature information and the identification information,
wherein the second neural network model is used to identify an object based on an image received from the external apparatus,
wherein the at least one instruction, when executed by the at least one processor, further causes the electronic apparatus to:
input the feature information into the second layer of the first neural network model to acquire first identification information,
input the feature information into the fourth layer of the second neural network model to acquire second identification information,
based on a difference between the first identification information and the second identification information being greater than a threshold value, acquire the feature information as learning data, the second neural network model being trained on the learning data, and
based on the difference between the first identification information and the second identification information being equal to or less than the threshold, not obtain the feature information as the learning data.

2. The electronic apparatus of claim 1, wherein the at least one instruction, when executed by the at least processor individually or collectively, further causes the electronic apparatus to:
train the first neural network model to update the second parameter based on a plurality of images included in the learning data, the feature information, and the identification information.

3. The electronic apparatus of claim 1, wherein the at least one instruction, when executed by the at least one processor individually or collectively, further causes the electronic apparatus to:
based on the first identification information and the second identification information being different, acquire the first identification information as identification information corresponding to the feature information.

4. The electronic apparatus of claim 1, wherein the at least one instruction, when executed by the at least one processor individually or collectively, further causes the electronic apparatus to:
receive a plurality of identification information, and a plurality of feature information respectively corresponding to the plurality of identification information, and based on quantities of each of the plurality of feature information differing from each other, adjust the quantities of at least one of the feature information such that the quantities of each of the plurality of feature information become identical with each other.

5. The electronic apparatus of claim 1, wherein the at least one instruction, when executed by the at least one processor individually or collectively, further causes the electronic apparatus to:
update a parameter of the second neural network model to reduce a difference between the first identification information acquired by inputting the feature information into the first neural network model and the second identification information acquired by inputting the feature information into the second neural network model.

6. A method for controlling an electronic apparatus, the method comprising:
quantizing a first neural network model for identifying an object stored in the electronic apparatus, to acquire a second neural network model;
quantizing a first parameter corresponding to a first layer included in the first neural network model for identifying an object;
training the first neural network model based on training data while the first parameter remains fixed, to update a second parameter corresponding to a second layer, which is a subsequent layer of the first layer;
quantizing the updated second parameter to obtain a fourth parameter;
obtaining a quantized second neural network model comprising a third layer including a third parameter identical to the first parameter, and a fourth layer including the fourth parameter,
transmitting information on the second neural network model to an external apparatus;
receiving, from the external apparatus, feature information for an image stored in the external apparatus acquired based on the second neural network model and identification information corresponding to the feature information; and
training the second neural network model to be personalized for a user of the external apparatus, based on the feature information and the identification information,
wherein the second neural network model is used to identify an object based on an image received from the external apparatus,
wherein the method further comprising:
inputting the feature information into the second layer of the first neural network model to acquire first identification information,
inputting the feature information into the fourth layer of the second neural network model to acquire second identification information,
based on a difference between the first identification information and the second identification information being greater than a threshold value, acquiring the feature information as learning data, the second neural network model being trained on the learning data, and
based on the difference between the first identification information and the second identification information being equal to or less than the threshold, not obtaining the feature information as the learning data.

7. The method of claim 6, wherein the updating the second parameter comprises:
training the first neural network model to thereby update the second parameter based on a plurality of images stored in the electronic apparatus, the feature information, and the identification information.

8. The method of claim 6, wherein the acquiring the feature information as the learning data comprises:
based on the first identification information and the second identification information being different, acquiring the first identification information as identification information corresponding to the feature information.

9. The method of claim 6, further comprising:
receiving a plurality of identification information, and a plurality of feature information respectively corresponding to the plurality of identification information, and
based on quantities of each of the plurality of feature information differing from each other, adjusting the quantities of at least one of the feature information such that the quantities of each of the plurality of feature information become identical with each other.

* * * * *